(12) United States Patent
Spencer, II

(10) Patent No.: US 8,452,242 B2
(45) Date of Patent: May 28, 2013

(54) FUNCTIONAL IDENTIFIERS ON WIRELESS DEVICES FOR GAMING/WAGERING/LOTTERY APPLICATIONS AND METHODS OF USING SAME

(75) Inventor: Carroll Alexis Spencer, II, Wilmington, NC (US)

(73) Assignee: Cell Lotto, Inc., Wilmington, NC (US)

( * ) Notice: Subject to any disclaimer, the term of this patent is extended or adjusted under 35 U.S.C. 154(b) by 0 days.

(21) Appl. No.: 10/429,313

(22) Filed: May 5, 2003

(65) Prior Publication Data

US 2004/0002355 A1 Jan. 1, 2004

Related U.S. Application Data

(63) Continuation-in-part of application No. 10/186,959, filed on Jun. 29, 2002, now abandoned.

(51) Int. Cl.
*H04B 1/38* (2006.01)

(52) U.S. Cl.
USPC ...... 455/90.3; 455/66.1; 455/550.1; 455/466; 455/566

(58) Field of Classification Search
USPC .......... 455/414.1, 414.2, 414.3, 422.1, 550.1, 455/575.1, 566
See application file for complete search history.

(56) References Cited

U.S. PATENT DOCUMENTS

| | | | | |
|---|---|---|---|---|
| 5,515,045 A * | 5/1996 | Tak | ............... | 341/23 |
| 5,555,550 A * | 9/1996 | Kaschke | .............. | 455/566 |
| 6,052,606 A * | 4/2000 | Bowen | .............. | 455/566 |
| 6,424,845 B1 * | 7/2002 | Emmoft et al. | ........... | 455/575.1 |
| 6,751,525 B1 * | 6/2004 | Crisp, III | ............... | 700/241 |
| 2001/0034237 A1 * | 10/2001 | Garahi | .............. | 455/456 |
| 2002/0111213 A1 * | 8/2002 | McEntee et al. | ........... | 463/42 |
| 2003/0109307 A1 * | 6/2003 | Boyd | ............... | 463/41 |

OTHER PUBLICATIONS

Sorkin, Andrew Ross, "Taking Virgin's Brand Into Internet Territory; Richard Branson Says the Web Is Ready for His Style of Business", Feb. 14, 2000, The New York Times.*

* cited by examiner

*Primary Examiner* — Lewis West
(74) *Attorney, Agent, or Firm* — Triangle Patents, PLLC

(57) ABSTRACT

A user interface provided for helping a consumer interact with a company, its products or services, such as conducting a business-related action and/or transaction, by interacting with a functionally identified functional component(s) on a wireless device. The functional component is functionally identified via the company's mark, including logos, trademarks, brand, name, etc. In addition, the invention provides for a method for gaming, wagering, betting, gambling, and/or lottery play through a wireless device interface by strategic placement of functional identifiers in or on components of a wireless device and a method of using the interface.

17 Claims, 4 Drawing Sheets

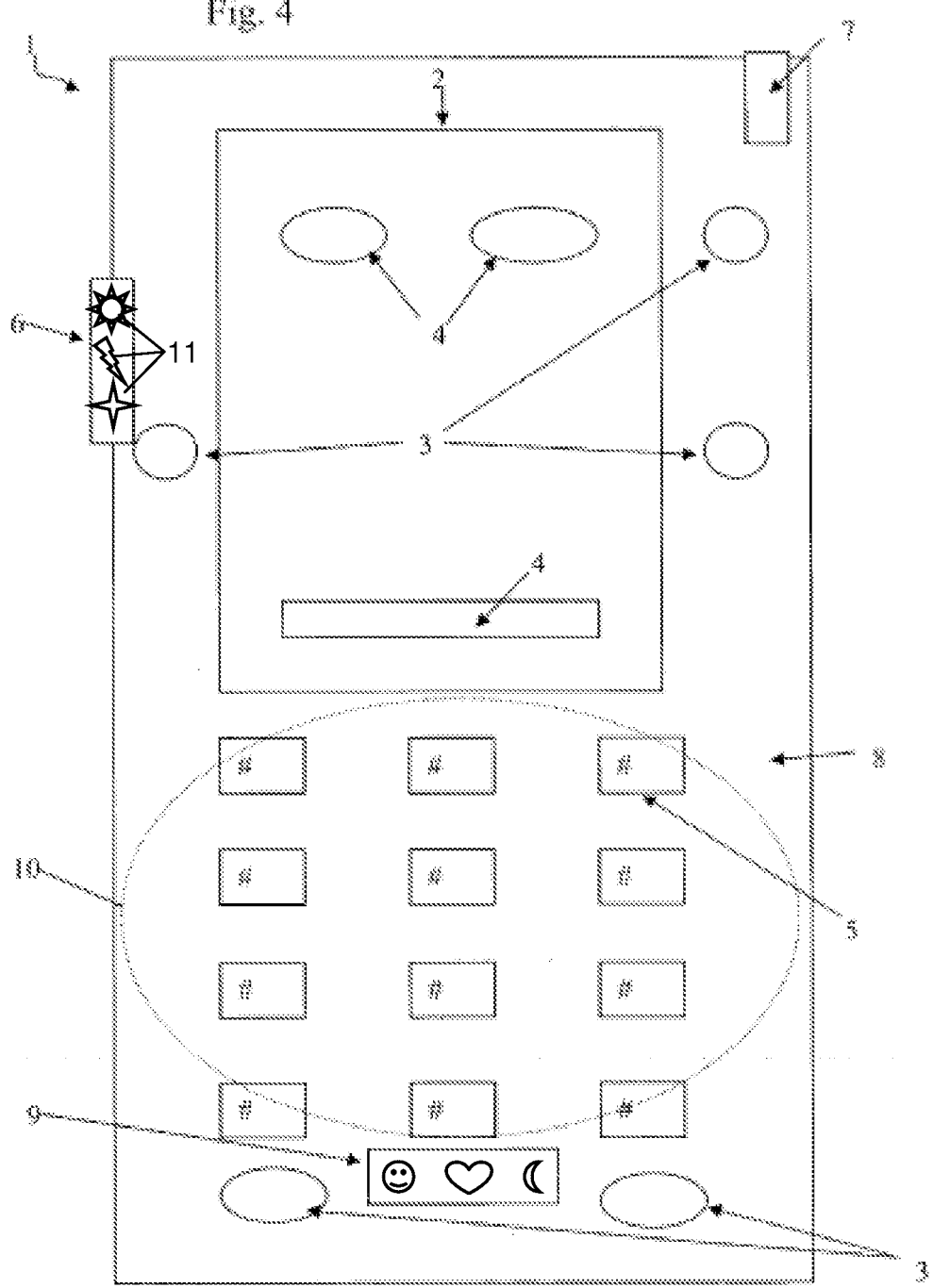

FUNCTIONAL IDENTIFIERS ON WIRELESS DEVICES FOR GAMING/WAGERING/LOTTERY APPLICATIONS AND METHODS OF USING SAME

CROSS-REFERENCE TO RELATED APPLICATIONS

This nonprovisional utility patent application claims the benefit of one or more prior filed copending nonprovisional applications; the present application is a Continuation-In-Part of application U.S. Ser. No. 10/186,959 filed Jun. 29, 2002 now abandoned, which is incorporated herein by reference in its entirety.

BACKGROUND OF THE INVENTION (1) Field of the Invention

The present invention relates generally to marketing and sales tools involving user interfaces and, more particularly, to strategic placement of functional identifiers on wireless devices for gaming, gambling, wagering, and/or lottery applications.

(2) Description of the Prior Art

Brand strategy is the business of developing brands based on thorough marketing knowledge and insight. It is a physical expression of how a business direction and key messages will communicate and establish value effectively across a broad range using several mediums to enhance awareness, impact and equity of the brand, in short increasing companies "goodwill" which is often more valuable than the break-up value of the companies assets. Marketing often takes advantage of the interface between a consumer and an object to create intangible value in the form of branding some business' product or service. Examples of such interfaces include billboards, packaging, and electronic displays (TV screens and computer monitors). Use of such interfaces creates commercial goodwill helping businesses sell their products and/or services.

Additionally, mobile phones are increasingly being used for entertainment purposes. By way of example, a German-based company, scaraboo, with a website found at www.s-caraboo.de, provides information regarding its commercially available gaming software for betting, lottery, and casino services, such software being used for electronic gaming. Scaraboo also mentions Siemens mobile as a collaborative entity for providing mobile network operations that function with its software. Such software is stated on the website to further include a mobile gaming platform with open interfaces for the integration of wireless gaming and gambling solutions based on Java™ programming that provide for personalization, localization, and notification channels.

Also, recent news articles report similar systems relating to "M-gambling," or gambling activities that are performed using cellular phones. In the Netherlands, Sweden, Germany, the United Kingdom, and Austria, regular mobile phones can be used to buy lottery tickets, bet on sporting events, or enter sweepstakes for prizes. Many countries in Asia are purported to be beginning to offer similar mobile phone-based services. This type of technology permits these activities without requiring face-to-face transactions between the phone user and another person for completing the transaction. However, the technology is typically based upon text messaging, and simply uses ordinary cellular phone devices, which are not automatically programmed or connected to particular sites that are of interest to the user, and do not permit additional advertising and/or commercial activity as part of the transaction.

Recently, in today's mobile information society, an unexploited and increasingly ubiquitous consumer-object interface has arisen, namely the use of wireless devices as an integral part of daily living. Although such devices often advertise the manufacturer of the device itself by including an identifying mark somewhere on the device, generally such marks are not interactive or functional and do not provide the end user with any true commercial function, in our model the consumer may through the mark itself interact in some way with the business, its product or services of his/her choice. The mark is nonfunctional at present. Thus, there is a need and opportunity for functional identifiers, or marks on wireless devices that function to induce and/or permit a consumer to interact with a business, its product or services, i.e., to purchase, order, request information or conduct some other business-related action and/or transaction using the user interface, including, in particular, gaming/gambling activities. The present invention recognizes and solves this developing marketing need and opportunity to place more control and ease of action and/or transaction in the hands of consumers. In a society that is becoming increasingly more mobile, this solution provides both parties with a tool, that increases efficiencies, and is very effective.

SUMMARY OF THE INVENTION

The present invention is directed to a device and method for gaming, gambling, wagering, and/or lottery applications through a wireless device interface by strategic placement of functional identifiers in or on the device, as well as to methods of using the same.

The present invention is directed to functionally identifying functional components of a wireless device with a mark or logo, something immediately recognized by the consumer as the functional key, this will be known from this point forward as the button(s). One aspect of the invention is to provide identifiers such as logos or trademarks on/beneath/around or near the surface of the button(s) on a wireless device for the purpose of facilitating the gaming, gambling, wagering, and/or lottery play by a user of the device by a categorization and/or branding or symbolic representation of different types of wagering that may occur using said button(s).

Another component of the present invention is to allow that such functional button(s) relate to the identifiers and function to facilitate interaction of a user with an authorized wagering business, its products or services in order to conduct a business-related or user driven action and/or transaction relating to wagering, e.g. a lottery wager.

These and other aspects of the present invention will become apparent to those skilled in the field, or discipline after reading of the following description of the preferred embodiment when considered with the drawings.

BRIEF DESCRIPTION OF THE DRAWINGS

FIG. 4 is a front view of a hybrid wireless device-personal digital assistant according to one embodiment of the present invention.

DETAILED DESCRIPTION OF THE INVENTION

Figure 1:
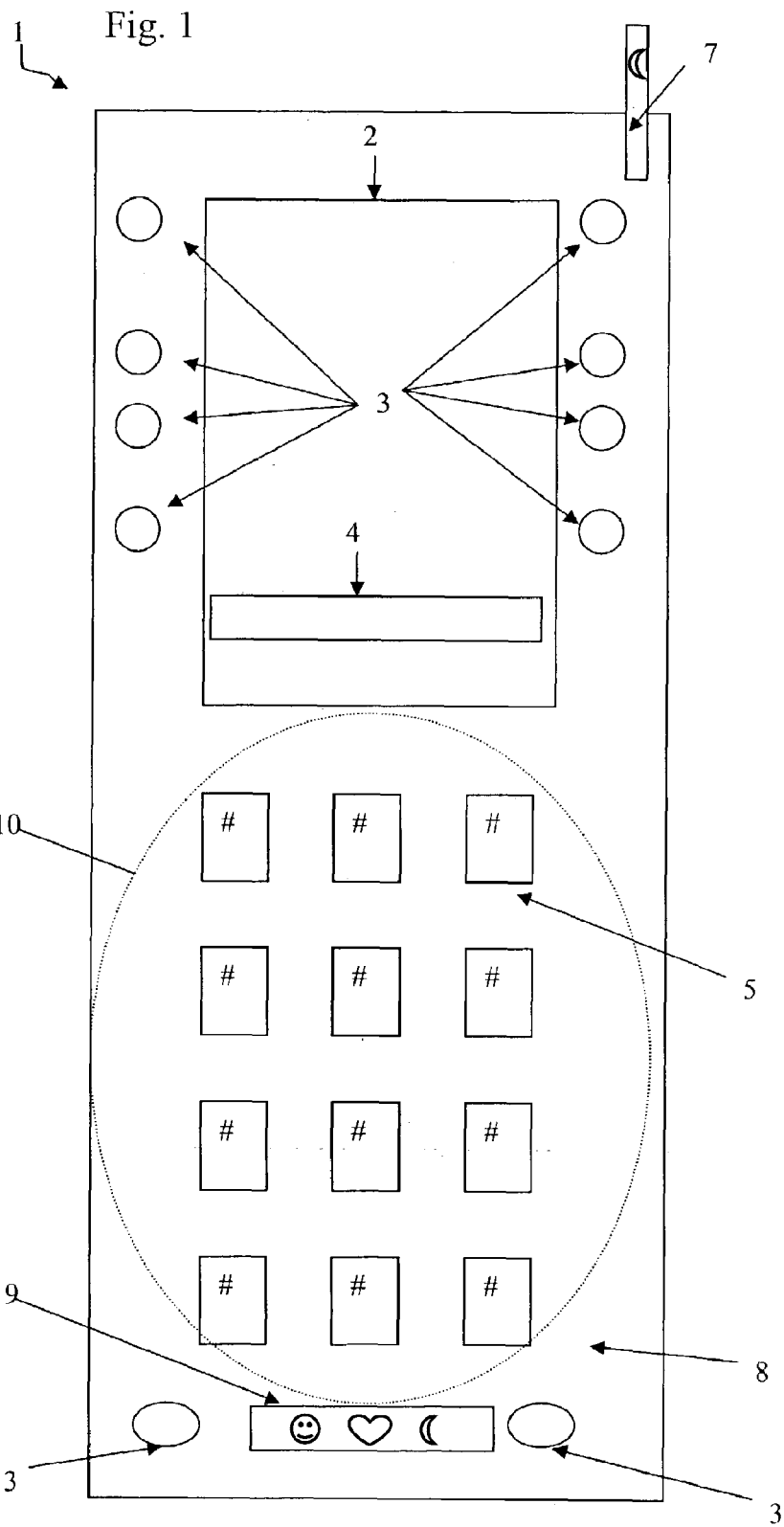
FIG. 1 is a front view of a cell phone according to one embodiment of the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Figure 2:
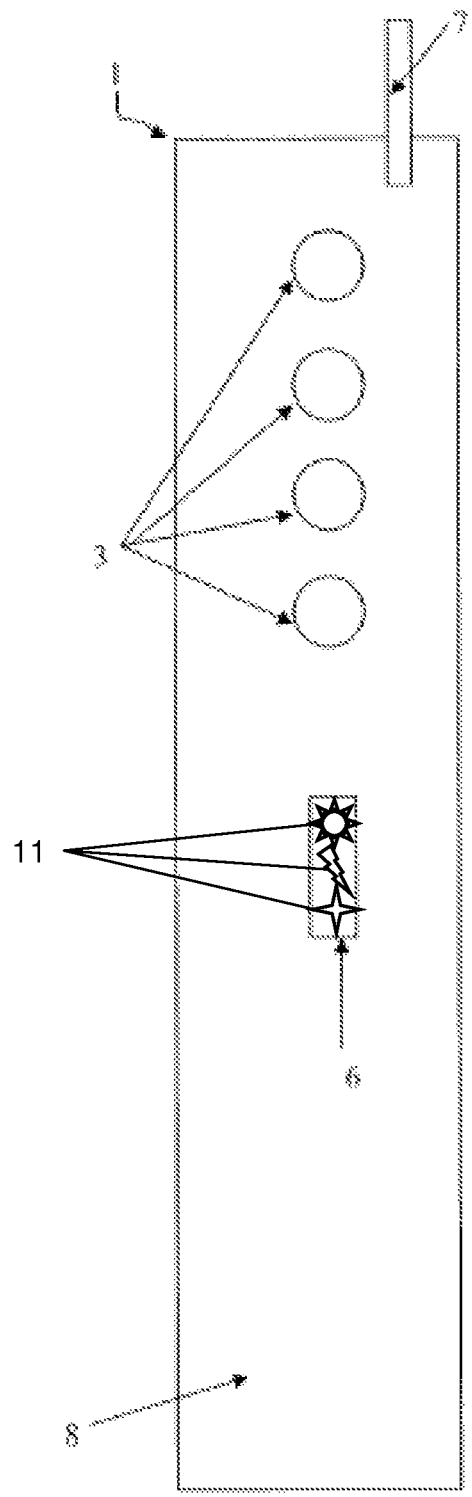
FIG. 2 is a side view of a cell phone according to one embodiment of the present invention.
Figure 3:
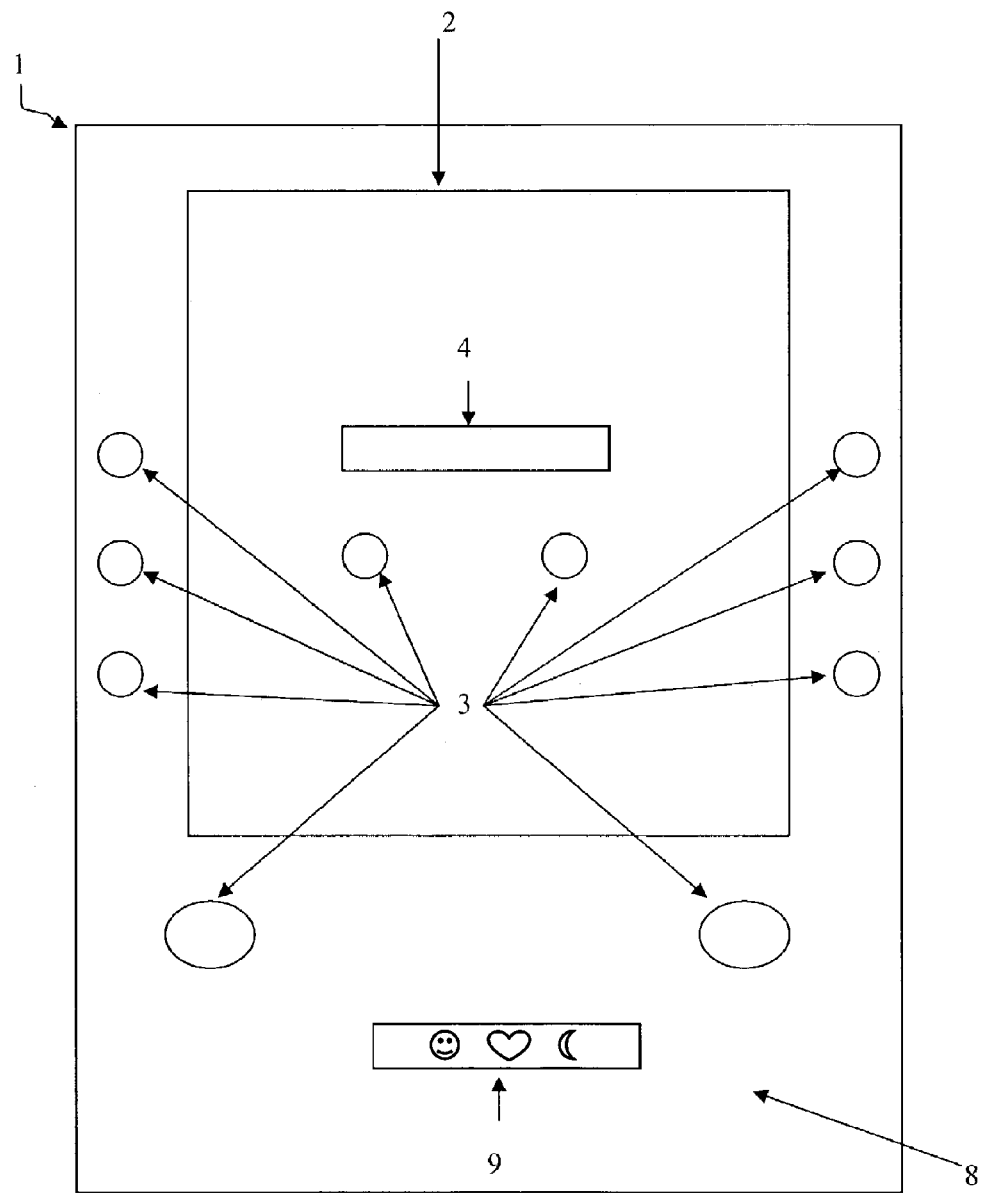
FIG. 3 is a front view of a personal digital assistant according to one embodiment of the present invention.

Referring now to the drawings in general, the illustrations are for the purpose of describing a preferred embodiment of the invention and are not intended to limit the invention thereto. FIGS. 1, 2, 3 and 4 illustrate preferred embodiments of the invention on wireless devices referred to generally with the reference numeral 1. Wireless devices are broad in device but for our purposes at present include cell phones, personal digital assistants (PDAs), hybrids of cell phones and personal digital assistants (PDAs). FIGS. 1 and 2 illustrate the invention on a cell phone. FIG. 3 illustrates one embodiment of the present invention on a PDA. FIG. 4 illustrates the invention on a hybrid wireless device-PDA.

The present invention provides for strategic placement of functional identifiers on wireless devices so they are directly associated with a functional component, namely a function button or button(s). Preferably, the functional identifiers are marks such as brands, names, symbols, logos, trademarks or labels. Alternatively, the functional identifiers may also include generic words such as "buy", "sell", etc.

The functional components of the wireless device form part of the user interface between the device and the user or consumer. Referring now to all of the figures, in a preferred embodiment, a functional identifier is associated with a functional component of wireless device 1, in particular the identifier is placed directly on the component or button. Referring to FIGS. 1 and 2, and FIG. 3 and FIG. 4, such components may further include an electronic display 2, physical buttons 3, or other interactive components on wireless devices, such as a virtual keyboard or virtual buttons that are produced by projection and light detection means.

A functional identifier may be placed on, beneath, around or near the surface of a physical function button. As seen in FIG. 1 and FIG. 4, in a preferred embodiment a functional identifier 5 may be placed beneath one of the numbers on a key pad 10 located on a wireless device 1. The placing of a functional identifier on a functional component or around a functional component is termed applying the functional identifier. A functional component to which a functional identifier has been applied is considered a marked or identified functional component. More than one functional component may be marked or identified on a wireless device. A functional identifier is applied to a physical function button on a wireless device by a manner such as printing, painting, embossing, adhesives, etc.

In the case of an electronic display 2 a functional identifier may be applied by electronic display of an electronic or digital button 4. An electronic display may be a touch screen. The user of the device interacts with the company whose mark is used as the functional identifier on the wireless device by activating or pressing the function button so marked; a business-related action and/or transaction occurs by that activation of the button by the user, e.g., a product is purchased, such as a beverage being purchased on location using equipment or from a machine that is programmed to communicate with the wireless device. In the present invention, a preferred embodiment provides for the function button to be associated with a wagering activity, such as the user placing a purchase of a lottery ticket and/or participating in another wagering activity that is associated with an authorized wagering entity, e.g., a casino, betting, gaming, or lottery sales entity located on a Native American reservation or in a state, country, or other locality that permits such wagering activities to occur, in particular in an electronic manner such as involving a computer, computer server, and/or other electronic device. A user may touch the electronically displayed functional identifier to achieve some action and/or transactional end as with a physical function button, which in the case of the present invention includes wireless gaming activities, such as placing a wager electronically and wirelessly using a mobile wireless communications device, including but not limited to cellular phones, digital mobile wireless phones, combination devices such as personal digital assistant (PDA)-phones, portable computers with voice over IP or other telephonic communication means, and combinations thereof.

In a preferred embodiment, the function of the component is pre-programmed, programmable and may be predetermined by the manufacturer and/or by software that is included with the device having the functional identifier and/or functional component or button included thereon. Such a component may be considered dedicated to the services, products, functions associated with mark with which it is identified; in the present invention, more particularly, mobile gaming software may be included therewith for providing software running on the device that permits the user to seamlessly interact with gaming sites and/or facilities that permit gaming and/or wagering access electronically and/or via mobile phone, telecommunications, and/or Internet-based or network-based telephony/telephonic communications. One such software that may be used is provided commercially by a German-based company, scaraboo, with a website found at www.s-caraboo.de, which provides information regarding its commercially available gaming software for betting, lottery, and casino services. Scaraboo also mentions Siemens mobile as a collaborative entity for providing mobile network operations that function with its software. Such software is stated on the website to further include a mobile gaming platform with open interfaces for the integration of wireless gaming and gambling solutions based on Java™ programming that provide for personalization, localization, and notification channels. The present invention includes software having features similar to those mentioned on the website hereinabove referenced, but is not limited to any particular software embodiment, so long as the software provides for the activation of the functional components as set forth herein. By way of example, alternatively, a user or consumer programs a functional component to a functional identifier for use in wireless gaming and/or gambling automatically via the connection provided with the programmed functional identifier and functional component on the wireless communication device for interacting with a gaming/gambling site, which may be an actual physical site and/or a virtual site that is provided on the Internet as a website, which is hosted by a server in a location where said gaming is permitted.

In a preferred embodiment, functional identifiers and their related or corresponding functional components may be located anywhere on a wireless device; the functional identifiers may be juxtapositioned physical buttons. Also, there may be at least one, but preferably a multiplicity of functional identifiers and related or corresponding functional components, i.e., individual physical buttons. Additionally or alternatively, each button may have more than one functional identifier associated therewith or corresponding thereto. Preferably, each button has between about one (1) to about three (3) functional identifiers. In the case of a multiplicity of functional identifiers per button, each of the different functional identifiers and its corresponding function is activated in a unique manner for that button, e.g., a first functional identifier and its associated function are accessed by activating the button with a single press or selection; a second functional identifier and its associated function are accessed by activating the button with a press or selection of an additional button, for example a shift button; a third functional identifier and its associated function are accessed by activating the button with a press or selection of a different additional button or at least two buttons prior to a press or selection of the main button having the functional identifier.

In FIGS. 1, 2, 3 and 4, the functional identifier's position relative to the function component or button is represented by the arrows from component 8 indicating empty spaces or zones on a wireless device 1 that are proximal to buttons but not directly on the components or buttons themselves. In a preferred embodiment, as seen in FIG. 2 and FIG. 4, a functional identifier 6 is placed on a functional component located on a side of the wireless device 1.

Functional components include components like numeric buttons normally found on a wireless device or components added to a wireless device for more function options for consumers. Also, the functional components may have various shapes and sizes, so long as they are sized and configured for use by the user of the device. A functional identifier may also be placed on a component for which a function button is not normally associated. By way of example, not limitation, as seen in FIGS. 1 and 2 and FIG. 4, a functional identifier is placed on an antenna 7 attached to wireless device 1.

A user or consumer interacts with a wireless device for some interactive purpose. In a preferred embodiment, functional components may serve numerous functions including dialing, connecting, starting or transacting. These functions serve to implement the consumer or user's interactive purpose, i.e., to make a business-related action and/or transaction without requiring additional user action. In a preferred embodiment, a consumer or user activates, selects or presses a marked functional component on a wireless device, such as a physical function button, and the device interacts with the company represented by that identifier, e.g., by making a business action and/or transaction or purchase using a credit card or by dialing a phone number to connect a consumer or user to a predetermined destination such as a business's information, help, service or product center, or professional services group tracking previously ordered product without requiring additional user action. Note that the user may provide additional information, such as a unique user identifier or authorization or confirmation of the action and/or transaction, at a subsequent level in the interaction with the company, its products and/or services, although establishing the initial interaction with the company does not require additional user action. In particular, the present invention includes transactions that have gaming, gambling, wagering, and/or lottery play applications, wherein the company may include but is not limited to a company that provides for gaming, gambling, wagering, and/or lottery play, such as a casino.

In another preferred embodiment, interaction with a functional component permits a consumer or user to facilitate actions and/or transactions, including those having an education component. These actions and/or transactions may include the purchasing, depositing, transferring and charging to or from one or another institution(s), or other financial transactions or actions, including education and information-based actions that are related to the particular transaction at hand, which in the case of the present invention, including gaming, gambling, betting, wagering, purchasing lottery ticket(s), and the like, and combinations thereof. Such actions and/or transactions may include automatic deduction of funds from a user's account, which may be an account connected to the gaming/wagering entity, such as a house account for gambling and betting activities with a casino, or from a traditional financial institution, such as the user's bank account, wherein the gaming/wagering fees can be automatically deducted from the account at the user's instruction via at least one preprogrammed functional component that is associated with a particular functional identifier. Other related actions and/or transactions may also include the use of credit cards, debit cards, and/or smart cards for the placing of a bet, paying a gaming/gambling fee, etc. In any of these cases, appropriate security is preferably provided via the user's preprogrammed functional components and/or via biometric or code-based security provided in connection with the device and the functional identifiers and their associated, corresponding functional components.

In one preferred embodiment, the mark of a credit card company may be placed on/beneath/around or near the component or button(s) and when the consumer executes the component or button the account of the consumer will be debited for the transaction, which may be gaming/gambling/lottery-related. In another preferred embodiment, a casino's logo may be placed on/beneath/around or near the component or button(s) and the consumer/user places a wager or can begin to play a game by pressing the component or button(s) identified by a mark of the casino. Also, to enter various games offered by the casino or other wagering/gaming entity, the user may be then required to press an additional component/button in order to play or bid on a variety of predetermined games or wagering activities, or play various lottery-related games. In another preferred embodiment, a consumer's financial institution has its logo placed on/beneath/around or near a button(s) and the consumer may interact with his or her account by pressing or selecting the component or button(s). In another preferred embodiment, a branded button is used as an aid to facilitate discounting and other promotional and advertising facilities.

In another embodiment, the user's interaction with a company, and its products or services via a functional component on a wireless device may also connect a consumer or user to a website on the Internet, from here the consumer can download a menu, from here the client could choose the direction to take, such as purchasing, checking account status and new deals or specials. The website may be an Internet service, chat service, on-line store, or may be a hosted ASP site, or any pre-determined Internet destination including B2B, and B2C. Also, activation of the function component or button may launch another service, like messaging services, such as AOL Instant Messenger provided by America On-Line, which are not website-dependent. As set forth in the foregoing, in a preferred embodiment the invention includes the option of the user preprogramming the destinations of their choice. In the case of gaming/wagering, the gaming/wagering entity may provide messages to the user via the mobile, wireless device to notify the user of particular matters relating to activities that the user has previously engaged in with the entity, such as updates on a lottery, e.g., the total amount of the prize being updated, the results of a lottery on a predetermined basis, such as the daily winner or winning number(s). These messages may be sent to the user via text or voice message, or the user can automatically receive updates by pressing the preprogrammed functional identifier/functional component, which automatically connects the user to the information/entity using the mobile device. Also, automatic update services may be accompanied by advertisements, which provide an additional revenue generation source relating to the transaction and/or activities performed by the user, based upon a fee being paid for advertisements to be sent in a targeted manner to the user based upon the user's history with a gaming/gambling entity such as lottery playing activity.

In another embodiment, interaction with a functional component starts a device such as a computer, a car, a radio, a television, or any electronic or mechanical device and could also include the retrieval of data such as lights on, and TV's off, even so far as being able to indicate or trigger an electronic-based security system of one's domicile.

A key aspect of this invention is any use of a marked functional identifier to component relationship that reinforces brand consciousness or awareness in the consumer or user. The combination of the mark and the functional component facilitates business actions and/or transactions by reducing the time for the user to implement an action and/or transaction. Transactions and/or actions are made more efficient, due to the fact that the consumer can quickly and easily scan a wireless device and immediately identify the mark associated with the action and/or transaction the consumer needs to implement. In addition, the marks on the wireless device serve a marketing function, namely branding, independent of their relationship with the functional component.

Another preferred embodiment is the method of marketing a business and/or reinforcing brand awareness through a wireless device interface including the step of applying functional identifiers to a functional component of a wireless device. Such application may be made strategically, as to attract the consumer to interact with the functional component. Strategic placement means placement of a mark in such a manner as to attract a user or consumer to use the component that has the mark.

Certain modifications and improvements will occur to those skilled in the art upon a reading of the foregoing description. By way of example, new components or extensions may be added to a wireless device that may be labeled with a functional identifier. Also, the present invention may be applied to cordless communication devices, such as traditional telephones operating with a cordless handset but a corded base or receiver station.

All modifications and improvements have been deleted herein for the sake of conciseness and readability but are properly within the scope of the following claims.

I claim:

1. A user interface for wireless mobile communication devices comprising:
   a multiplicity of functional identifiers associated with corresponding multiple functions applied to a single functional button of a wireless mobile communication device;
   the user interface permitting a user to interact with multiple remote service or product suppliers without requiring additional user action;
   the interaction occurring upon an activation of any of the multiplicity of functional identifiers;
   the interaction being initiated by the user for the purpose of making transaction including gaming, gambling, wagering, lottery play, or a combination thereof; and
   wherein the multiplicity of functional identifiers includes a categorization, branding, symbolic representation, or combination thereof of different types of wagering.

2. The interface according to claim 1 wherein the functional identifiers include marks, logos, brands, trademarks, or a combination thereof.

3. The interface according to claim 1 wherein the functional button is a physical button located on the wireless device.

4. The interface according to claim 1 wherein the functional identifiers are applied on a surface of the button, underneath a surface of the button, or combinations thereof.

5. The interface according to claim 1 wherein the functional button is an electronic display.

6. The interface according to claim 5 wherein the functional identifier is displayed electronically on the electronic display.

7. The interface according to claim 1, wherein a personal identifier is entered or registered on the device prior to any transaction occurring.

8. The interface according to claim 7, wherein the personal identifier is required to be entered by the user of the device prior to each transaction.

9. The interface according to claim 7, wherein the personal identifier is a biometric identifier that is associated with only one user.

10. The user interface of claim 1, wherein the functional components of the wireless device include an antenna.

11. The interface of claim 6, wherein the functional identifier is a mark, logo, brand or trademark.

12. The interface of claim 6, wherein the at least one digital button is a symbolic representation of a gaming category.

13. A device for facilitating mobile gaming comprising:
   a wireless mobile communication device having at least one functional button;
   each of the at least one functional button is associated with multiple corresponding interactions for permitting a user to engage in gaming, gambling, wagering, lottery play, or a combination thereof;
   a user interface having a multiplicity of functional identifiers associated with corresponding remote service or product supplier marks applied to the functional buttons;
   the functional buttons permitting the user to initiate the interactions with the remote service or product suppliers upon activation of the functional button without requiring additional user action; and
   the multiplicity of functional identifiers including a categorization, branding, symbolic representation, or combination thereof of different types of wagering.

14. The device of claim 13, wherein the functional components of the wireless device include an antenna.

15. A method for using a user interface on a wireless mobile communication device comprising:
   the step of the user activating a functional button of the wireless mobile communication device corresponding to a multiplicity of functional identifiers;
   wherein each of the multiplicity of functional identifiers are associated with marks of remote service or product suppliers;
   the step of the user activation of the functional button for permitting the user to interact with at least one of the remote service or product suppliers upon activation without requiring additional user interaction;
   wherein the interaction is performed for the purpose of gaming, gambling, wagering, lottery play, or a combination thereof; and
   wherein the functional identifiers include a categorization, branding, symbolic representation, or combination thereof of different types of wagering.

16. The user interface of claim 15, wherein the functional components of the wireless device include an antenna.

17. A method for using a user interface on a wireless mobile communication device comprising:
   the step of the user activating a functional button of the interface;

the functional button comprising a multiplicity of functional identifiers associated with corresponding multiple functions for permitting the user to interact with at least one remote account of a service or product supplier upon activation of the functional button without requiring additional user action;

the interactions being performed for the purpose of gaming, gambling, wagering, lottery play, account use, or combinations thereof; and wherein the multiplicity of functional identifiers further include categorization, electronic communication, identification, facilitation, or combinations thereof of the interactions; and wherein each of the multiplicity of functional identifiers additionally includes branding, a symbolic representation, or a combination thereof of the service or product supplier.

* * * * *